United States Patent
Kang (10) Patent No.: US 7,233,367 B2
(45) Date of Patent: Jun. 19, 2007

(54) DISPLAY APPARATUS AND CONTROL METHOD OF PICTURE THEREOF

(75) Inventor: Ho-woong Kang, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 541 days.

(21) Appl. No.: 10/793,821

(22) Filed: Mar. 8, 2004

(65) Prior Publication Data

US 2004/0246379 A1 Dec. 9, 2004

(30) Foreign Application Priority Data

Jun. 5, 2003 (KR) .................... 10-2003-0036305

(51) Int. Cl.
  *H04N 5/14* (2006.01)
  *H04N 5/57* (2006.01)
(52) U.S. Cl. .................... 348/673; 348/679; 348/687
(58) Field of Classification Search ............... 348/712, 348/713, 673, 678, 679, 686, 687, 690; *H04N 5/14, H04N 5/57*
See application file for complete search history.

(56) References Cited

U.S. PATENT DOCUMENTS

| | | | | |
|---|---|---|---|---|
| 5,459,528 A | * | 10/1995 | Pettitt ................ | 348/568 |
| 5,847,773 A | * | 12/1998 | Lagoni et al. ........ | 348/687 |
| 6,184,939 B1 | * | 2/2001 | Wang et al. ......... | 348/625 |
| 6,377,313 B1 | * | 4/2002 | Yang et al. .......... | 348/630 |

FOREIGN PATENT DOCUMENTS

| | | |
|---|---|---|
| JP | 6-350873 | 12/1994 |
| JP | 11-27602 | 1/1999 |
| JP | 11-088721 | 3/1999 |
| JP | 2000-152029 | 5/2000 |
| JP | 2002-341850 | 11/2002 |
| KR | 1997-31994 | 6/1997 |
| KR | 1998-13451 | 4/1998 |
| KR | 10-190975 | 1/1999 |
| KR | 10-238665 | 10/1999 |
| KR | 2000-21573 | 4/2000 |

OTHER PUBLICATIONS

The First Office Action issued by the State Intellectual Property Office of People's Republic of China in Application No. 200410043335.8 dated Apr. 7, 2006 (total of 14 pages).

* cited by examiner

*Primary Examiner*—Sherrie Hsia
(74) *Attorney, Agent, or Firm*—Staas & Halsey LLP (57) ABSTRACT

An apparatus for and a method of continuously adjusting a brightness and a contrast of a video display. An analog video signal is converted to provide digital luminance (Y) signals and amplitudes of the digital Y signals are adjusted based on determining whether the digital Y signals of a frame have amplitudes corresponding to one or more of four regions of digital values. The four regions include a highest region, a second highest region, a lowest region and a second lowest region. Contrast is adjusted based on whether digital Y values of the frame are included for the highest region and/or the second highest region and brightness is adjusted based on whether digital Y values are included for the lowest region and/or the second lowest region.

35 Claims, 7 Drawing Sheets

DISPLAY APPARATUS AND CONTROL METHOD OF PICTURE THEREOF

CROSS-REFERENCE TO RELATED APPLICATIONS

This application claims the benefit of Korean Patent Application No. 2003-36305, filed Jun. 5, 2003, in the Korean Intellectual Property Office, the disclosure of which is incorporated herein by reference.

BACKGROUND OF THE INVENTION

1. Field of the Invention

The present invention relates to a display apparatus and a method of controlling a picture of the display apparatus, and more particularly, to a display apparatus and a method of automatically controlling brightness and contrast of a screen of the display based on a luminance signal (e.g., a Y signal).

2. Description of the Related Art

In general, a display apparatus such as a TV decodes broadcasting signals transmitted from a broadcasting company to video signals to provide picture information to viewers. External video signal apparatuses such as a Video Tape Recorder (VTR) and a Digital Video Disc (DVD) are also used to transmit the video signals for the display apparatus. Such a display apparatus receives the video signals including a Y signal and a chrominance signal (e.g., an U/V signal) as an input from a source of the video signals, such as a broadcasting company, or an external video signal apparatus, and displays images using the input Y signal and the U/V signal.

A user may control contrast or brightness of an image, and screen size in a conventional display apparatus by means of a remote controller. Herein, the contrast and the brightness of displayed images are adjustable in response to an input control signal which is input through the remote controller.

Figure 1A:
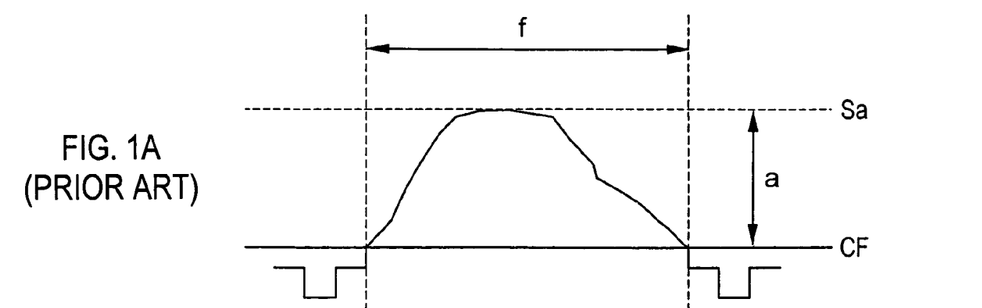
FIGS. 1A–1C illustrate waveforms of conventional analog signals.
Figure 1B:
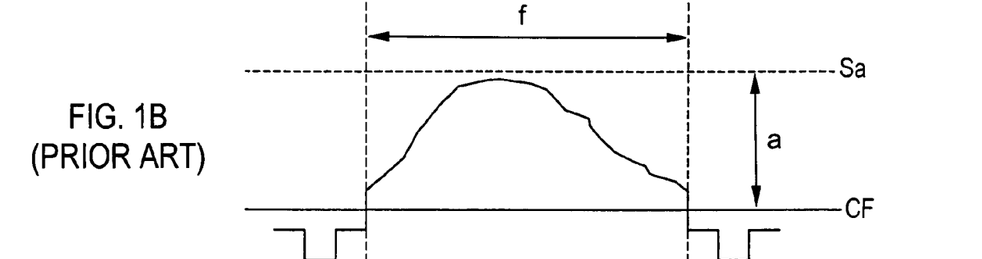
Figure 1C:
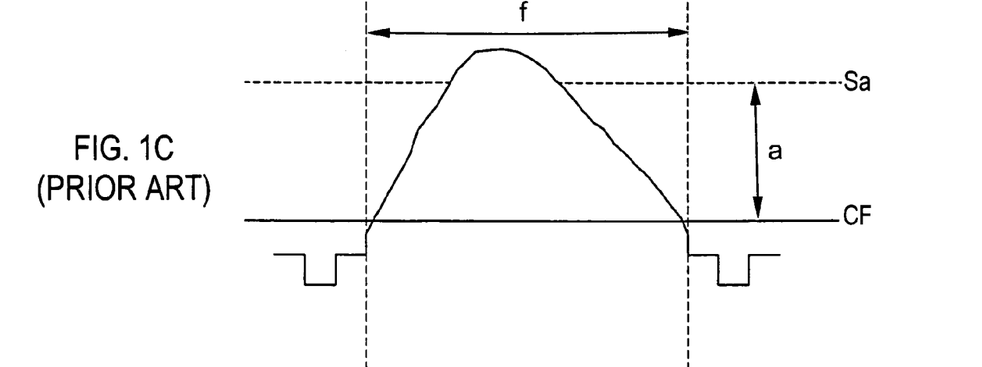

FIGS. 1A, 1B and 1C illustrate a general waveform of the Y signal input to a conventional display apparatus. As shown in FIGS. 1A, 1B and 1C, a region f stores picture information of each frame, Sa indicates a saturation level, and CF is a cutoff level determining brightness of the Y signal. In a case of an ideal Y signal, an amplitude a of the region f is located between the saturation level Sa and the cutoff level CF.

However, the ideal Y signal is not often obtainable since the Y signal for the display apparatus varies depending on each of the broadcasting companies, a type of the video signals transmitted from each broadcasting company and the different types of video signals provided by the external video signal apparatuses. Thus, if the saturation level is exceeded or the signal level falls below the cutoff level, the display apparatus may encounter problems and display blurred images or images having some missing pixels.

As described above, the conventional display apparatus is inconvenient because the user must re-adjust the contrast or the brightness to optimize display settings if a channel and/or contents of the current display are changed, or if a DVD player or a VTR is used.

SUMMARY OF THE INVENTION

Accordingly, it is an aspect of the present invention to provide a display apparatus and method which automatically controls a Y signal based on an input Y signal, thereby having a screen display with optimized contrast and brightness.

The forgoing and/or other aspects of the present invention are achieved by providing a display apparatus comprising a signal converting part which converts an analog video signal to a digital luminance (Y) signal and a digital chrominance (U/V) signal and transmits the converted signals; and a control part which increases a contrast level when the digital Y signal per frame exceeds a predetermined saturation level, or decreases the contrast level when no digital Y signal per frame exists in the saturation level.

According to an aspect of the invention, the display apparatus further comprises a frame buffer which temporarily stores the digital Y signal and the digital chrominance signal transmitted from the signal converting part.

According to an aspect of the invention, the control part changes the contrast level based on the digital Y signal stored in the frame buffer.

According to an aspect of the invention, the display apparatus may further comprise a Y counter which detects information of the digital Y signal transmitted by the signal converting part.

According to an aspect of the invention, the control part changes the contrast level based on the digital Y signal information detected by the Y counter.

According to an aspect of the invention, the control part controls the signal converting part to transmit an increased or decreased digital Y signal and thereby changes the contrast level.

According to an aspect of the invention, the control part limits ranges of increasing and decreasing of the digital Y signal.

According to an aspect of the invention, the control part increases a brightness level when the digital Y signal per frame is below a predetermined cutoff level, and decreases the brightness level when no digital Y signal per frame exists in the cutoff level.

According to an aspect of the invention, the control part changes the brightness level based on the digital Y signal saved in the frame buffer.

According to an aspect of the invention, the display apparatus further includes a Y counter detecting information of the digital Y signal coming out of the signal converting part.

According to an aspect of the invention, the control part changes the brightness level based on the digital Y signal information detected by the Y counter.

According to an aspect of the invention, the control part controls the signal converting part to transmit the digital Y signal with a changed size to change the brightness level.

According to an aspect of the present invention, the forgoing and/or other aspects may be also achieved by providing a display apparatus comprising a signal converting part which converts an analog video signal to the digital luminance (Y) signal and the digital chrominance (U/V) signal and transmits the converted signal; and a control part which increases a brightness level when the digital Y signal per frame is below a predetermined cutoff level, or decreases the brightness level when no the digital Y signal per frame exists in the cutoff level.

According to an aspect of the invention, the control part changes the brightness level based on the digital Y signal stored in the frame buffer.

According to an aspect of the invention, the display apparatus further comprises a Y counter which detects information of the digital Y signal output by the signal converting part.

According to an aspect of the invention, the control part changes the brightness level based on the digital Y signal information detected by the Y counter.

According to an aspect of the invention, the control part controls the signal converting part to transmit the digital Y signal with a changed size to change the brightness level.

According to another aspect of the present invention, the forgoing and other aspects may be also achieved by providing a method of controlling a display apparatus comprising, converting an analog video signal into digital luminance (Y) signals and digital chrominance signals; dividing the digital Y signals of each frame into regions including a plurality of levels and counting the digital Y signals corresponding to each of the regions; and increasing the contrast level when no digital Y signal exists in a second highest region among the plurality of regions.

According to an aspect of the invention, the picture control method further comprises decreasing the contrast level when at least one of the digital Y signals exists in the highest region and at least one of the digital signals exists in the second highest region.

According to an aspect of the invention, the picture control method further comprises maintaining a current contrast level when at least one of the digital Y signals exists in the second highest region and no digital Y signal exists in the highest region.

According to an aspect of the invention, the picture control method further comprises decreasing the brightness level when no digital Y signal exists in a second lowest region among the plurality of regions.

According to an aspect of the invention, the picture control method further comprises increasing the brightness level when at least one of the digital Y signals exists in the second lowest region and at least one of the digital Y signals exists in the lowest region.

According to an aspect of the invention, the picture control method further comprises maintaining the current brightness level when at least one of the digital Y signals exists in the second lowest region but no digital Y signal exists in the lowest region.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
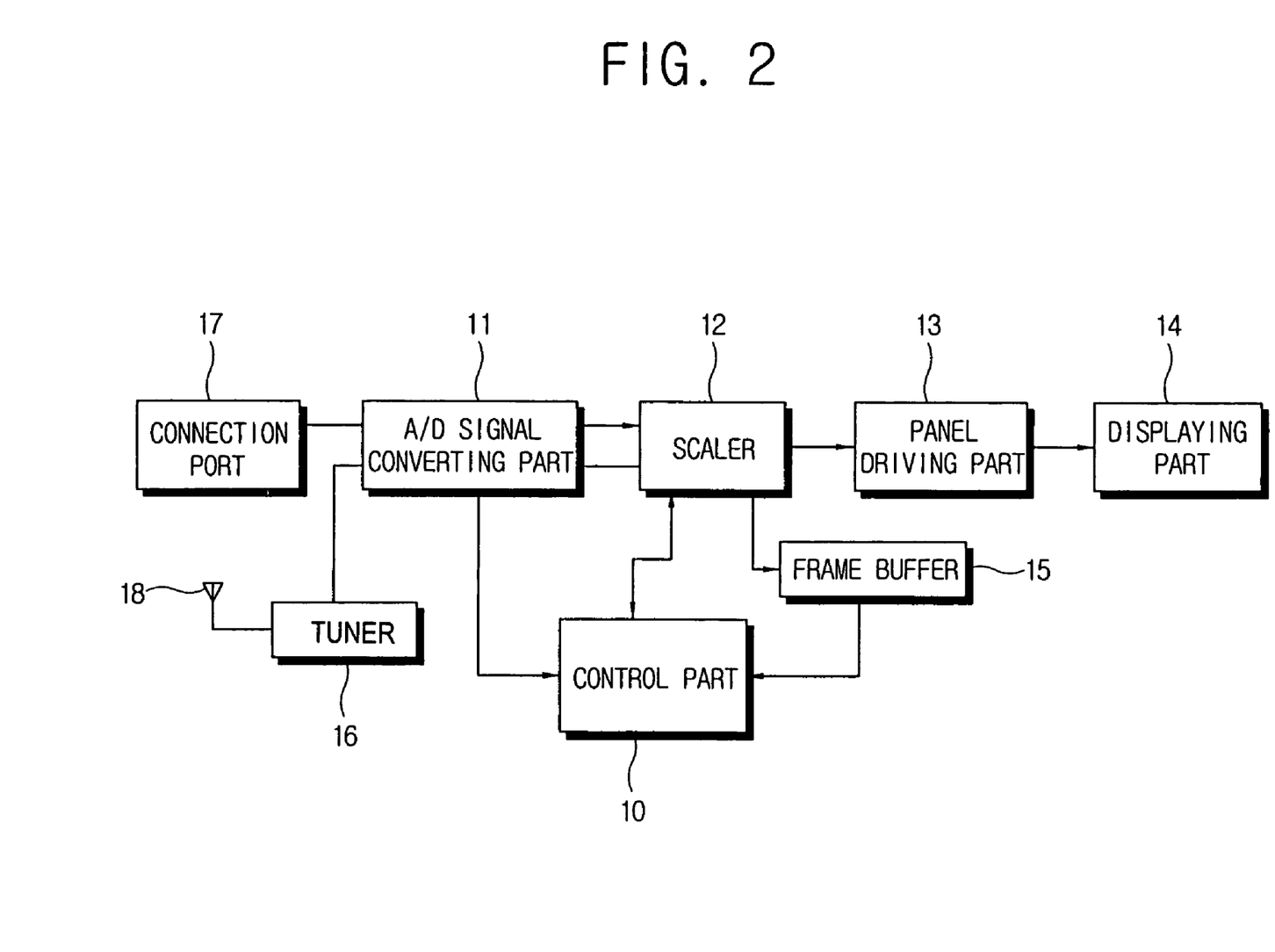
FIG. 2 is a control block diagram of a display apparatus according to a first embodiment of the present invention.
Figure 3:
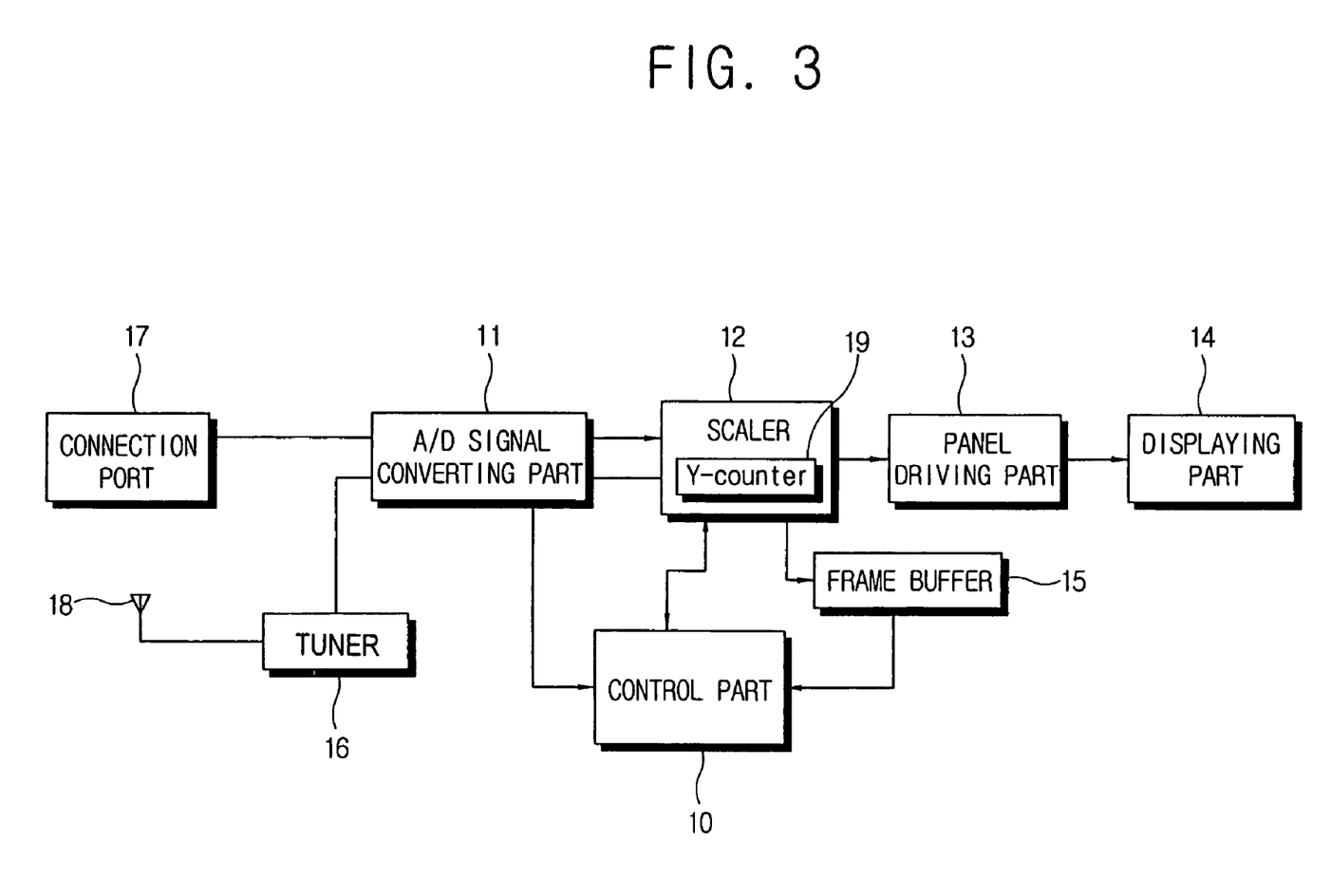
FIG. 3 is a control block diagram of the display apparatus according to a second embodiment of the present invention.

As shown in FIG. 2 and FIG. 3, a display apparatus according to the present invention comprises a signal converting part 11 which converts an analog video signal to digital video signals and transmits the digital video signals; a scaler 12 which scales a size of the digital video signals transmitted from the signal converting part 11 and outputs scaled digital video signals; a frame buffer 15 which temporarily stores the scaled digital video signals transmitted from the signal converting part 11; a panel driving part 13 which drives a display part 14 based on the scaled digital video signals transmitted from the scaler 12; a control part 10 which controls the signal converting part 11, the scaler 12, the frame buffer 15, and the panel driving part 13.

The analog video signal which the signal converting part 11 receives, comprises one of an analog video signal applied from an antenna 18 and a tuner 16 and a video signal applied through a connection port 17 connected to the external video signal apparatus, such as for example, a DVD player or a VTR. The analog video signal further comprises an analog luminance signal (e.g. Y signal) and an analog chrominance signal (e.g. U/V signal). The signal converting part 11 converts the analog Y signal and the analog chrominance signal into digital Y signals and digital U/V signals, respectively, and outputs the digital Y signals and the digital U/V signals.

The control part 10, according to the present invention, increases a contrast level in case that at least one digital Y signal in each frame exceeds a pre-determined saturation level. Also, the control part 10 decreases the contrast level in case that no digital Y signal in each frame exists in the predetermined saturation level. Herein, the saturation level is an upper region of the digital Y signal as described below.

The control part 10, according to the present invention, variably changes the contrast level controlling the signal converting part 11 to output the digital Y signal whose size is amplified or compressed. That is, the control part 10 increases the contrast level by means of controlling the signal converting part 11 to convert the analog video signal into an amplified digital Y signal and output the amplified digital Y signal if there is a digital Y signal in each frame which exceeds the predetermined saturation level. On the contrary, if no digital Y signal in each frame exists in the saturation level, the control part 10 decreases the contrast level by controlling the signal converting part 11 to convert the analog video signal into a compressed digital Y signal and outputs the compressed digital video signal.

The control part 10, according to the present invention, increases a brightness level if at least one digital Y signal in each frame is below the predetermined cutoff level, and decreases the brightness level if there is no digital Y signal in each frame in the predetermined cutoff level. Herein, the cutoff level is a lower region of the digital Y signal levels as described below.

The control part 10, according to the present invention, variably changes the brightness level, controlling the signal converting part 11 to output the digital Y signal whose size is increased or decreased. That is, the control part 10 increases the contrast level by controlling the signal converting part 11 to convert the analog video signal into the increased digital Y signal and output the increased digital Y signal if a digital Y signal in each frame is below the predetermined cutoff level. On the contrary, if no digital Y signal in each frame exists in the cutoff level, the control part 10 decreases the brightness level by means of controlling the signal converting part 11 to convert the analog video signal into the decreased digital Y signal and output the decreased digital Y signal.

Herein, the display apparatus according to the first embodiment of the present invention, controls the contrast level and/or the brightness level to be variable based on temporarily saved digital Y signals in the frame buffer 15, as shown in FIG. 2.

Also according to the second embodiment of the present invention, the display apparatus further comprises a Y counter 19 which detects information of the digital Y signal transmitted from the signal converting part 11, as illustrated in FIG. 3. The control part 10 controls the brightness level and the contrast level to be variable based on the information of the digital Y signals detected by the Y counter 19.

Figure 4:
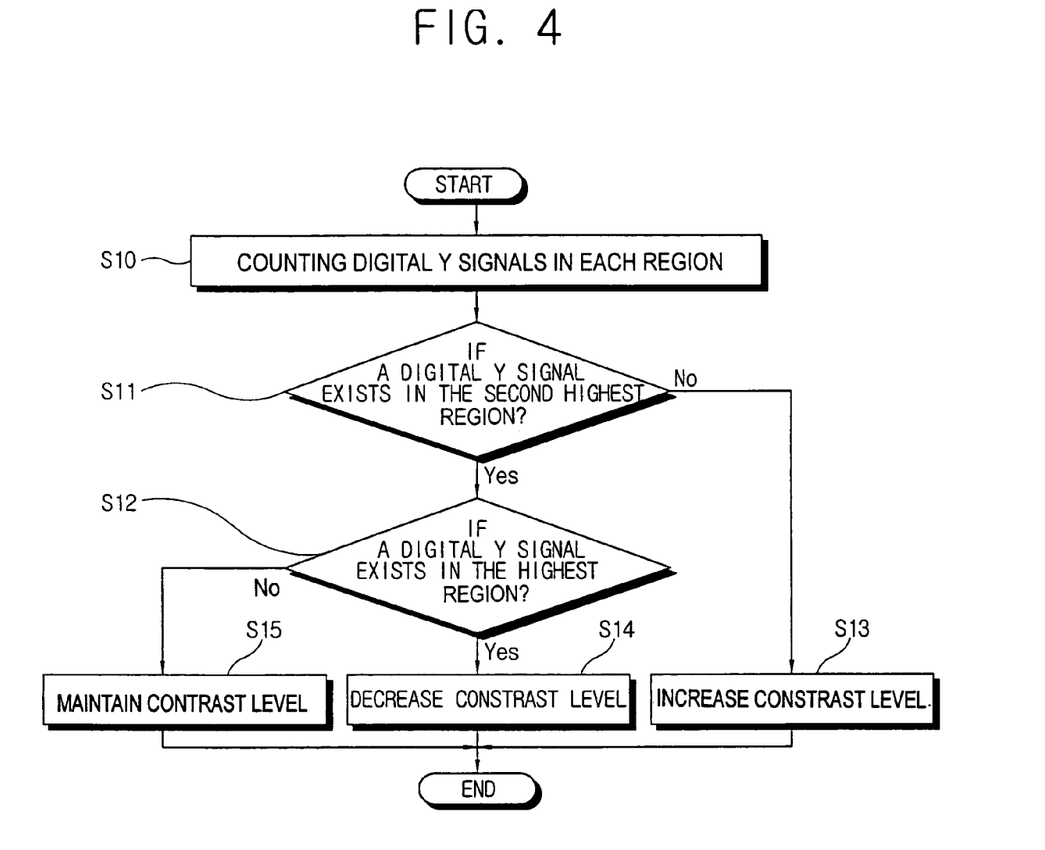
FIG. 4 is a control flow chart of a method of controlling a contrast level according to the present invention.

Referring to FIGS. 3 and 4, a method of controlling the contrast of the display apparatus according to the present invention is as follows.

The analog Y signal is converted into the digital Y signals having predetermined bits. For example, where the signal converting part 11 in the present invention converts the analog Y signal into eight-bit digital Y signals, each digital Y signal has one of 256 digital signal levels. At this point, the control part 10 reads the digital Y signal information from the frame buffer 15 or the Y counter 19 in each frame and counts the digital Y signals corresponding to each of a plurality of predetermined regions of signal levels, at operation S10. For example, the 256 levels may be divided into 16 regions as indicated in FIG. 7.

Figure 7:
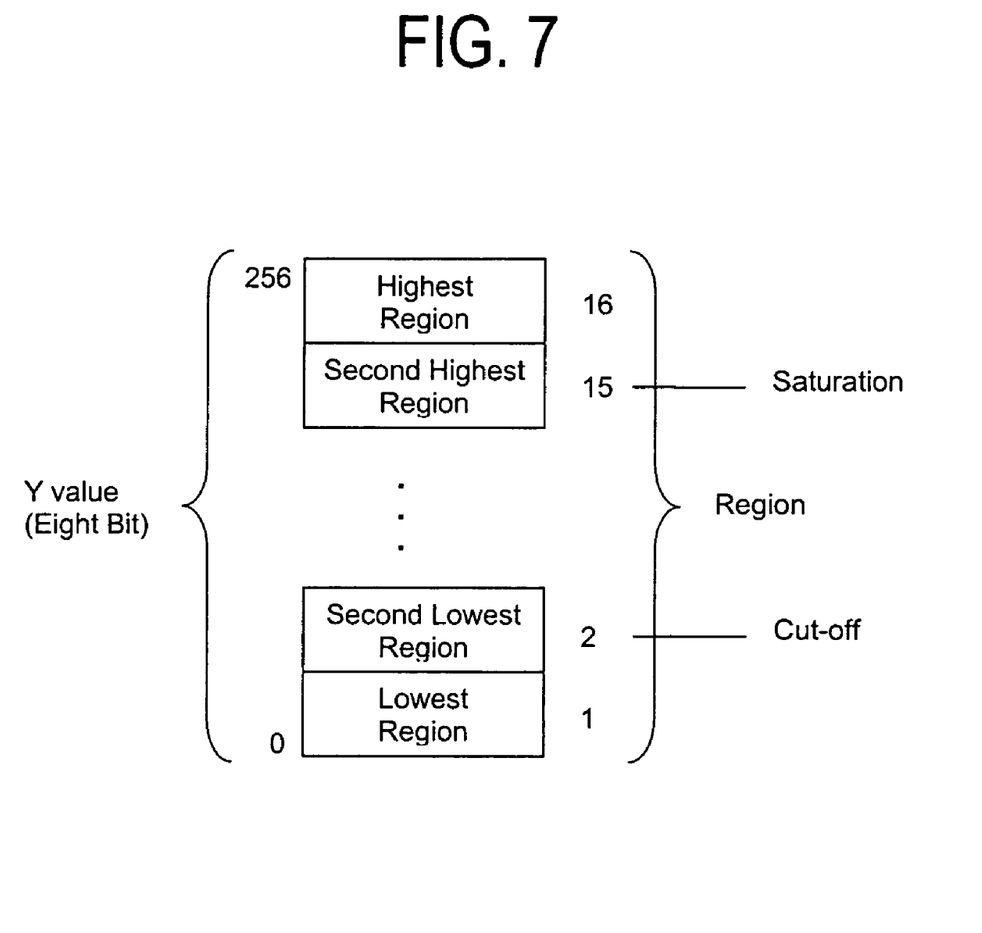
FIG. 7 is a diagram for identifying various regions of signal levels.

After counting the digital Y signals, the control part 10 examines whether at least one of the digital Y signals exists in a second highest region as shown in FIG. 7, at operation S11. Herein, the second highest region corresponds to the saturation level. At operation S13, the control part 10 controls the signal converting part 11 to convert the analog video signal into the amplified digital Y signal and outputs the amplified digital Y signal if there is no digital Y signal in the second highest region, so that the contrast level is increased. After the control part controls the above operations, the contrast level of an image signal subsequently input is increased and the increased contrast image signal is displayable on the screen.

At operation S12, the control part 10 examines whether at least one digital Y signal exists in the highest when the at least one digital Y signal exists in the second highest region. The control part 10 controls the signal converting part 11 to convert the analog video signal into the compressed digital Y signal and outputs the compressed digital Y video signal if the at least one digital Y signal exists in the highest region, so that the contrast level of an image signal subsequently input is decreased. After the control part controls the above operations, the contrast level is decreased at operation S14 and the input image signal is displayed on the screen. If there is no digital Y signal in the highest region at operation S12, the control part 10 maintains a current contrast level at operation S15.

Figure 5:
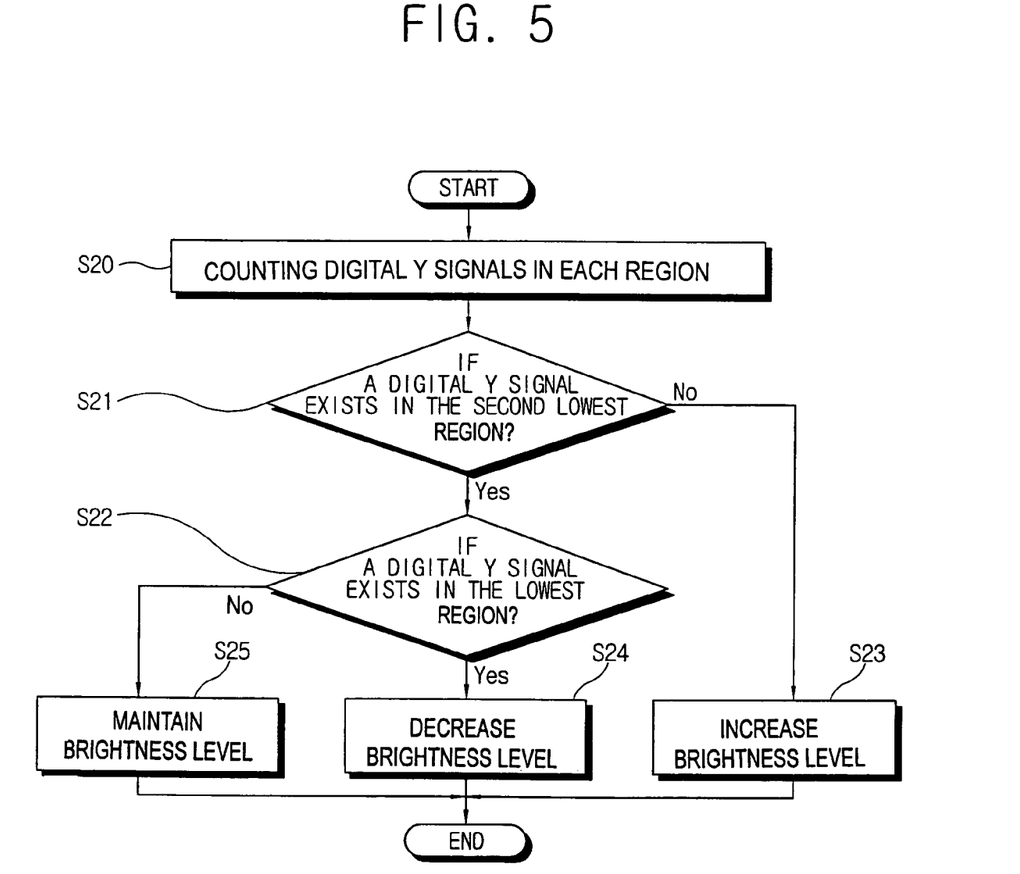
FIG. 5 is a control flow chart of a method of controlling a brightness level according to the present invention.

Referring now to FIG. 5, a process of controlling the brightness of the display apparatus according to the present invention is as follows.

The control part 10 reads the digital Y signal information from the frame buffer 15 or the Y counter 19 in each frame, and counts the digital Y signals corresponding to each of the plurality of the predetermined regions of signal levels, at operation S20. After counting the digital Y signals, the control part 10 examines whether at least one digital Y signal exists in a second lowest level as shown in FIG. 7, at operation 21. Herein, the second lowest region corresponds to the cutoff level. At operation 23, the control part 10 controls the signal converting part 11 to convert an analog video signal into the increased digital Y signals and outputs the increased digital Y signals if there is no digital Y signal in the second lowest level, so that the brightness level is increased. After the control part controls the above operations, the brightness level of an image signal subsequently input is increased so that the input image signal is displayable on the screen.

At operation S22, the control part 10 examines whether at least one digital Y signal exists in the lowest region when the at least one digital Y signal exists in the second lowest region. The control part 10 controls the signal converting part 11 to convert the analog video signal into the decreased digital Y signals and sends out the decreased digital Y video signals if the at least one digital Y signal exists in the lowest region, so that the brightness level is decreased. After the control part controls the above operations, the brightness level of an image signal subsequently input is decreased and the input image signal is displayable on the screen. If there is no digital Y signal in the lowest region at operation S22, the control part 10 maintains the current brightness level at operation S25.

Figure 6:
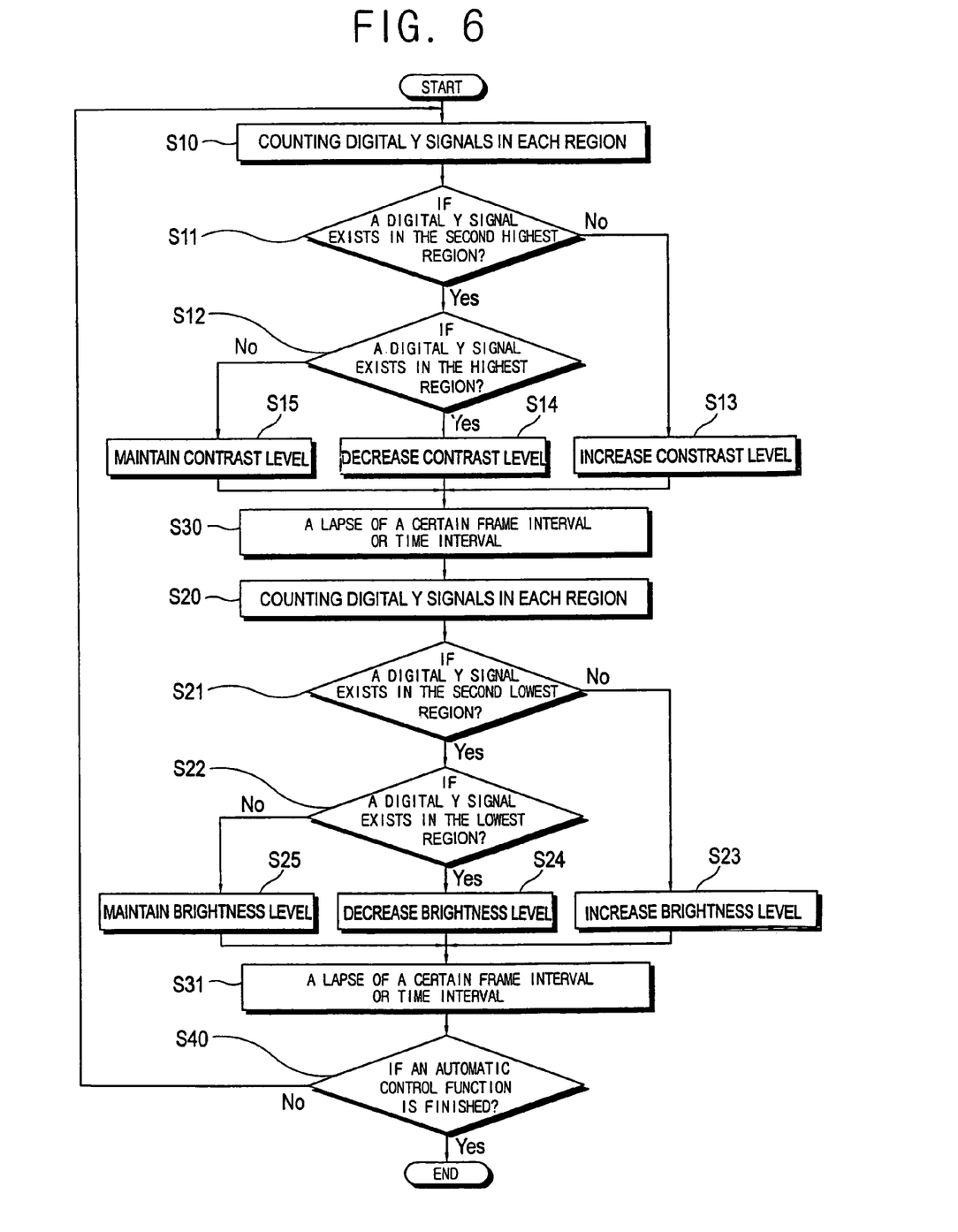
FIG. 6 is a control flow chart of the method controlling contrast level and brightness level according to the present invention.

FIG. 6 illustrates a method of screen control with a combination of the method of controlling the brightness level and of the method of controlling the contrast level of the display apparatus according to the present invention. As shown in FIG. 6, after the contrast level control is completed for one frame, the brightness level control is performed on a next frame after a lapse of a certain frame interval or time interval at operation S30. Upon completion of the brightness level control and after a lapse of a certain frame interval or time interval at operation S31, the method continues with the contrast control or stops the method at operation S40. Thus, the brightness and the contrast levels are continuously controlled to optimize the screen automatically in accordance with the variation of the analog video signal. In FIG. 6, each control operation corresponding to the operations in FIG. 4 and FIG. 5 uses the same reference number and further explanation thereof will not be repeated.

As illustrated at operation S40 in FIG. 6, if a user wants to stop the automatic controls of the brightness level and the contrast level in the present invention, the user may, for example, use a control button in a remote control to input a stop command, wherein the control part 10 senses an input signal responding to the control button and stops the automatic control of the contrast level and the brightness level. Thus, the display apparatus according to the present invention will provide the user a choice whether to use the automatic controls of the contrast level and/or the brightness level.

The control part 10 of the display apparatus according to the present invention, provides a limited range of amplifying and compressing for the digital Y signal which is transmitted after being amplified and/or compressed by the signal converting part 11, thereby preventing an undesirable screen image from being displayed of overly amplifying and/or compressing the contrast level of the analog video signal to selectively control a ratio of brightness to darkness. Herein, the range of amplifying and compressing may have limits on repeating counts and amplitude; the repeating count of amplifying and compressing is limited after a certain number of times continued, and the amplitude of amplifying and compressing has a limited amplitude ratio of continuous amplifying and compressing of memorizing an initial amplitude.

Therefore, an optimized contrast level for an image display may be automatically setup by increasing the contrast level when at least one digital Y signal per frame exists exceeding the saturation level, or decreasing the contrast level when no digital Y signal per frame exists in the saturation level.

Also, the optimized the bright level for the image display can be automatically setup by increasing the brightness level when at least one digital Y signal per frame exists below the cutoff level, or by decreasing the brightness level when no the digital Y signal per frame exists in the cutoff level.

The example embodiments shown in FIGS. 3–6 are explained based on comparing a count of the digital Y signals in each of the highest, second highest, lowest and second lowest regions with a number one in order to determine whether the contrast or the brightness is to be changed. That is, if the count is zero in a respective region, the digital Y signal does not exist in the respective region and if the count in the region is greater than one, the digital Y signal exists in the region. However, persons of skill in the art will recognize that the counts for each region may also be compared with respective predetermined numbers which are greater than one or with a same predetermined number which is greater than one in order to determine whether to adjust the contrast and/or the brightness of the picture.

With a configuration as described above, the display apparatus and method according to the present invention provides an automatic control based on information of an input Y signal, thereby having a screen display with optimized contrast and brightness.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
 a signal converting part which converts an analog video signal to digital luminance (Y) signals and/or digital chrominance (U/V) signals and transmits the converted signals;
 a control part which controls a contrast level based on comparing at least one of the digital Y signals per frame with a predetermined saturation level; and
 a Y counter which detects information of the digital Y signals transmitted from the signal converting part.

2. The display apparatus according to claim 1, wherein the control part increases the contrast level when the at least one of the digital Y signals per frame exceeds the predetermined saturation level.

3. The display apparatus according to claim 1, wherein the control part decreases the contrast level when none of the digital Y signals per frame exceeds the saturation level.

4. The display apparatus according to claim 1, further comprising a frame buffer which temporarily stores the digital Y signals and the digital chrominance signals transmitted from the signal converting part.

5. The display apparatus according to claim 4, wherein the control part controls the contrast level based on the digital Y signals stored in the frame buffer.

6. The display apparatus according to claim 4, wherein the control part changes a brightness level based on the digital Y signals stored in the frame buffer.

7. The display apparatus according to claim 1, wherein the control part changes the contrast level based on the digital Y signal information detected by the Y counter.

8. The display apparatus according to claim 1, wherein the control part controls the signal converting part to transmit amplified or compressed digital Y signals to change the contrast level.

9. The display apparatus according to claim 8, wherein the control part limits respective ranges of increasing and decreasing of the digital Y signals.

10. The display apparatus according to claim 1, wherein the control part increases a brightness level when the at least one digital Y signal per frame is below a predetermined cutoff level.

11. The display apparatus according to claim 10, wherein the control part changes the brightness level based on the digital Y signal information detected by the Y counter.

12. The display apparatus according to claim 10, wherein the control part controls the signal converting part to transmit the digital Y signals with a changed size to change the brightness level.

13. The display apparatus according to claim 1, wherein the control part decreases a brightness level when none of the digital Y signals per frame is below a predetermined cutoff level.

14. The display apparatus according to claim 13, wherein the control part controls the signal converting part to transmit the digital Y signals with a changed size to change the brightness level.

15. The display apparatus according to claim 1, wherein the control part changes a brightness level based on the digital Y signal information detected by the Y counter.

16. A display apparatus comprising:
 a signal converting part which converts an analog video signal to digital luminance (Y) signals and digital chrominance (U/V) signals and transmits the converted signals;
 a control part which controls a brightness level based on comparing at least one of the digital Y signals per frame with a predetermined cutoff level; and
 a Y counter which detects information of the digital Y signals output by the signal converting part.

17. The display apparatus according to claim 16, further comprising a frame buffer which temporarily stores the digital Y signals and the chrominance signals transmitted from the signal converting part.

18. The display apparatus according to claim 17, wherein the control part changes the brightness level based on the digital Y signals saved in the frame buffer.

19. The display apparatus according to claim 16, wherein the control part changes the brightness level based on the digital Y signal information detected by the Y counter.

20. The display apparatus according to claim 16, wherein the control part controls the signal converting part to transmit the digital Y signals with a changed size to change the brightness level.

21. The display apparatus according to claim 16, wherein the control part increases the brightness level when the at least one of the digital Y signals per frame is at the predetermined cutoff level.

22. The display apparatus according to claim 16, wherein the control part decreases the brightness level when none of the digital Y signals per frame exists at the predetermined cutoff level.

23. A method of controlling a picture of a display apparatus comprising:
generating digital luminance (Y) signals from an analog video signal;
dividing the digital Y signals of each frame into a plurality of regions, each region comprising a plurality of levels and determining whether the digital Y signals corresponding to some of the regions exist; and
increasing a contrast level of the picture when no digital Y signals exists in a second highest of the plurality of regions.

24. The method of controlling a picture according to claim 23, further comprising:
decreasing the contrast level when at least one of the digital Y signals exists in a highest region and at least one other of the digital signals exists in the second highest region.

25. The method of controlling a picture according to claim 24, further comprising:
maintaining a current contrast level when at least one of the digital Y signals exists in the second highest region and no digital Y signal exists in the highest region.

26. The method of controlling a picture according to claim 24, further comprising:
decreasing a brightness level when no digital Y signal exists in a second lowest of the plurality of regions.

27. The method of controlling a picture according to claim 26, further comprising:
increasing the brightness level when at least one of the digital Y signals exists in each of the second lowest region and the lowest region.

28. The method of controlling a picture according to claim 27, further comprising:
maintaining a current brightness level when the at least one of the digital Y signals exists in the second lowest region and no digital Y signal exists in the lowest region.

29. A method of controlling a picture, comprising:
generating digital luminance (Y) signals from an analog video signal;
dividing the digital Y signals of each frame into a plurality of regions, each region comprising a plurality of levels and determining whether the digital Y signals corresponding to some of the regions exist; and
increasing a brightness level of the picture when no digital Y signal exist in a second lowest of the plurality of regions.

30. The method of controlling a picture according to claim 29, further comprising:
increasing the brightness level when at least one of the digital Y signals exists in the second lowest region and at least one of the digital Y signals exists in the lowest region.

31. The method of controlling a picture according to claim 30, further comprising:
maintaining a current brightness level when at least one of the digital Y signals exists in the second lowest region and no digital Y signal exists in the lowest region.

32. A method of controlling a picture, comprising:
generating digital luminance (Y) signals from an analog video signal;
dividing the digital Y signals of each frame into a plurality of regions, each region comprising a plurality of levels and counting the digital Y signals per frame corresponding to a highest region, a second highest region, a lowest region and a second lowest region;
adjusting a contrast level of the picture based on the counts of the digital Y signals in the highest and second highest regions; and
adjusting a brightness level of the picture based on the counts of the digital Y signals in the lowest and second lowest regions.

33. The method of controlling a picture according to claim 32, wherein the levels are equally divided into the regions.

34. The method of controlling a picture according to claim 32, wherein the adjusting of the contrast level of the picture comprises:
increasing the contrast level when a count of the digital Y signals in the second highest region is less than a predetermined number;
decreasing the contrast level when the respective counts of the digital Y signals in the highest region and in the second highest region are equal to or greater than predetermined number; and
maintaining a current contrast level when the count of the digital Y signals in the second highest region is greater than or equal to the predetermined number and the count of the digital Y signals in the highest region is less than the predetermined number.

35. The method of controlling a picture according to claim 32, wherein the adjusting of the brightness level of the picture comprises:
decreasing the brightness level when a count of the digital Y signals in the second lowest region is less than a predetermined number;
increasing the brightness level when the respective counts of the digital Y signals in the lowest region and the second lowest region are greater than or equal to the predetermined number;
maintaining a current brightness level when the count of the digital Y signals in the second lowest region is greater than or equal to the predetermined number and the count of the digital Y signals in the lowest region is less than the predetermined number.

* * * * *